(12) United States Patent
Tsuchida et al.

(10) Patent No.: US 8,133,541 B2
(45) Date of Patent: Mar. 13, 2012

(54) HYDROXYALKYLATED CHITOSAN SOLUTION

(75) Inventors: Shinya Tsuchida, Chuo-ku (JP); Nobuyuki Kobayashi, Chuo-ku (JP); Takanori Sannan, Chuo-ku (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 638 days.

(21) Appl. No.: 12/223,091

(22) PCT Filed: Dec. 19, 2006

(86) PCT No.: PCT/JP2006/325237
§ 371 (c)(1),
(2), (4) Date: Jul. 22, 2008

(87) PCT Pub. No.: WO2007/086211
PCT Pub. Date: Aug. 2, 2007

(65) Prior Publication Data
US 2010/0291306 A1 Nov. 18, 2010

(30) Foreign Application Priority Data
Jan. 25, 2006 (JP) .................. 2006-016554
Aug. 4, 2006 (JP) .................. 2006-213775

(51) Int. Cl.
*B05D 3/02* (2006.01)
(52) U.S. Cl. ............... 427/384; 427/385.5; 427/388.1; 427/388.2
(58) Field of Classification Search .................. None
See application file for complete search history.

(56) References Cited

U.S. PATENT DOCUMENTS

| | | | |
|---|---|---|---|
| 4,780,310 A * | 10/1988 | Lang et al. | 424/47 |
| 5,571,392 A | 11/1996 | Sato et al. | |
| 6,698,507 B2 * | 3/2004 | Hamamura et al. | 165/133 |
| 2004/0028632 A1 * | 2/2004 | Maillefer et al. | 424/70.2 |
| 2004/0092620 A1 | 5/2004 | Kobayashi et al. | |
| 2005/0103229 A1 | 5/2005 | Tanaka et al. | |
| 2005/0201966 A1 * | 9/2005 | Ueyama et al. | 424/70.12 |
| 2006/0165624 A1 * | 7/2006 | Ueyama et al. | 424/70.11 |
| 2008/0114096 A1 * | 5/2008 | Qu et al. | 524/18 |

FOREIGN PATENT DOCUMENTS

| | | |
|---|---|---|
| CN | 1594406 | 3/2005 |
| EP | 0585885 A2 | 3/1994 |
| JP | 06-080704 | 3/1994 |
| JP | 2002-105241 | 4/2002 |
| JP | 2003-201576 | 7/2003 |
| JP | 2003-239197 | 8/2003 |
| JP | 2005-281654 | 10/2005 |

* cited by examiner

*Primary Examiner* — Erma Cameron
(74) *Attorney, Agent, or Firm* — Chapman and Cutler LLP

(57) ABSTRACT

This invention relates to hydroxyalkylated chitosan solution characterized in that a hydroxyalkylated chitosan and an organic acid or its derivative are contained in an aprotic polar solvent. This invention also relates to a coating process of a substrate, which is characterized by a step of causing the hydroxyalkylated chitosan solution to adhere onto a surface of the substrate, and another step of heating the substrate, which has been obtained in the first-mentioned step, at 100° C. or higher for 1 second or longer. This invention can provide a one-pack solution of a chitosan derivative, which is free from crosslinking and stable at room temperature, can form a chitosan coating excellent in waterproofness after heated and dried, and is suited for the coating of a hydrophobic or lipophilic surface. This invention also provides a coating process of a substrate, which makes use of the one-pack solution.

12 Claims, No Drawings

HYDROXYALKYLATED CHITOSAN SOLUTION

TECHNICAL FIELD

This invention relates to a hydroxyalkylated chitosan solution and its use.

BACKGROUND ART

Chitosan is a naturally-occurring polysaccharide, and industrially, it is produced by deacetylating chitin isolated from crustaceans such as shrimps, lobsters or crabs. Chitosan is equipped with functions such as film-forming properties, antimicrobial activities, water retention properties and flocculating ability, and therefore, have been put in practical use as a functional polymer in various fields. In recent years, its applications are actively under way especially as a safe functionalizing agent capable of imparting these functions to various substrates. For example, Patent Document 1 discloses a water-based substrate treatment composition containing chitosan or the like and a metal compound. Chitosan is also widely used as antimicrobiality-imparting coating formulations for various films, nonwoven fabrics and fiber products. One of technologies desired for these coating formulations is concerned with solutions of chitosan or derivatives thereof in solvents other than water.
Patent Document 1: JP-A-2003-201576

DISCLOSURE OF THE INVENTION

Problem to be Solved by the Invention

Chitosan itself dissolves neither in water nor in organic solvents, but in a dilute aqueous acid solution of an organic acid such as citric acid, acetic acid or lactic acid, chitosan forms a salt with the organic acid and dissolves. By coating various substrates with this dilute aqueous acid solution of chitosan and causing its water to evaporate, films can be formed with durability in dry forms. Therefore, such dilute aqueous acid solutions of chitosan can readily impart the unique functions of chitosan to various substrates.

A chitosan solution can be in the form of an aqueous solution, when a substrate surface onto which the chitosan solution is to be applied is hydrophilic. When a substrate surface is hydrophobic or lipophilic, on the other hand, the coating of an aqueous solution of a chitosan derivative results in its repelling so that no uniform coating is available. A solution of a chitosan derivative in a solvent other than water is, therefore, desired for substrates the surfaces of which are hydrophobic or lipophilic. There has, however, been unknown to date any solution of a chitosan derivative, which makes use of a solvent other than water and is suited for coating hydrophobic or lipophilic surfaces.

Chitosan readily dissolves in dilute aqueous acid solutions, but except for such dilute aqueous acid solutions, no solvents are known to able to effectively dissolve chitosan, to say nothing of solvents suited for coating applications. With respect to chitosan derivatives other than those having high degrees of substitution, no solvent is known to be suited either for their dissolution except for the above-mentioned dilute aqueous acid solutions, to say nothing of solvents suited for coating applications. There is, accordingly, an outstanding desire for nonaqueous solvents (organic solvents) capable of preparing solutions of chitosan derivatives, which are suited for coating hydrophobic or lipophilic surfaces.

Further, dry films available from aqueous chitosan solutions, which have been commonly employed, have a problem in that they show solubility to water and are poor in waterproofness, because organic acids remain in the dry films.

Similar to usual polymers, it is also practiced to add various crosslinking agents to aqueous solutions of chitosan so that the resulting coatings are crosslinked (see, for example, JP-B-2781990). This method has already found wide-spread utility in general industrial applications, because it has many advantages such that it can readily achieve crosslinking in a single step by appropriately choosing a crosslinking agent to be used and its use conditions and that it can control the property of the resulting coating ranging from high waterproofness that it practically does not swell in water to such waterproofness that it does not dissolve in water but absorbs water and swells substantially.

However, the crosslinking agents known to date have high reactivity, and therefore, are accompanied by problems in that solutions available after mixing the crosslinking agents are short in pot life and the inherent properties of chitosan are reduced in the resulting coatings although the resulting coatings are provided with improved waterproofness.

Objects of the present invention are, therefore, to provide a one-pack solution of a chitosan derivative, which is free from crosslinking and stable at room temperature, can form a chitosan coating excellent in waterproofness after drying under heat, and is suited for the coating of a hydrophobic or lipophilic surface, and a coating process of a substrate, which makes use of the one-pack solution.

Means for Solving the Problem

The above-described objects can be achieved by the present invention to be described hereinafter. Described specifically, the present invention provides a hydroxyalkylated chitosan solution comprising an aprotic polar solvent, a hydroxyalkylated chitosan, and an organic acid or a derivative thereof.

In the present invention as described above, the aprotic polar solvent may preferably be at least one solvent selected from the group consisting of N,N-dimethylformamide, N,N-dimethylacetamide, N-methyl-2-pyrrolidone, N-ethyl-2-pyrrolidone, 1,3-dimethyl-2-imidazolidinone, and dimethyl sulfoxide; the organic acid may preferably be a polybasic acid; and the polybasic acid may preferably be at least one acid selected from the group consisting of pyromellitic acid, citric acid, trimellitic acid, malic acid, polymaleic acid, phthalic acid, and succinic acid.

In the present invention as described above, the organic acid or the derivative thereof may be used preferably in an amount of from 20 to 300 parts by weight per 100 parts by weight of the hydroxyalkylated chitosan; the hydroxyalkylated chitosan may be contained preferably at a concentration of from 1 to 40 wt %; the hydroxyalkylated chitosan may preferably have a hydroxyalkylation degree of at least 0.2; and the hydroxyalkylated chitosan may preferably be a hydroxyalkylation product of chitosan, the chitosan has a deacetylation degree of at least 30%, and, when the chitosan is dissolved at a concentration of 1 wt % in a 1 wt % aqueous solution of acetic acid, a resulting solution has a viscosity of from 1 mPa·s to 10,000 mPa·s.

The present invention also provides a coating process of a substrate, which comprises a step of causing the above-described hydroxyalkylated chitosan solution to adhere onto a surface of the substrate, and another step of heating the substrate, which has been obtained in the first-mentioned step, at not lower than 100° C. for at least 1 second. In the process, the hydroxyalkylated chitosan solution may preferably comprise organic or inorganic particles and the substrate may preferably be a metal article.

ADVANTAGEOUS EFFECTS OF THE INVENTION

According to the present invention, it is possible to provide a hydroxyalkylated chitosan solution, which can form a chitosan coating of excellent waterproofness on a hydrophobic or lipophilic surface without needing another chemical such as a crosslinking agent, and also a coating process of a substrate, which makes use of the solution.

BEST MODES FOR CARRYING OUT THE INVENTION

The present invention will next be described in further detail based on preferred embodiments.

As mentioned above, there was not known to date any solution of a chitosan derivative (hydroxyalkylated chitosan), which makes use of an organic solvent suited for coating a hydrophobic or lipophilic surface. The present inventors, therefore, conducted an enthusiastic investigation about conditions for dissolving a hydroxyalkylated chitosan in an organic solvent. As a result, the present inventors found that, when the hydroxyalkylated chitosan and an organic acid or its derivative (which may hereinafter be referred to as "the organic acid", including the derivative) is added to various aprotic polar solvents, the hydroxyalkylated chitosan and the organic acid interact and hydroxyalkylated chitosan solutions are obtained.

Further, the chitosan solution was coated on a surface of a substrate, the solvent was caused to evaporate off by reduced-pressure drying to form a coating, the substrate was heated at 180° C. or higher for 30 seconds, and the substrate was then immersed in water. As a result, it was confirmed that even 24 hours later, no changes were visually observed on the coating and the formed coating became a waterproof coating.

The hydroxyalkylated chitosan solution according to the present invention is characterized in that the hydroxyalkylated chitosan and the organic acid are contained in the aprotic polar solvent.

Preferably, the hydroxyalkylated chitosan for use in the present invention may have a structure that an alkylene oxide or oxiranemethanol is added to the amino group of chitosan, like hydroxyethyl chitosan, hydroxypropyl chitosan, hydroxybutyl chitosan or glycerylated chitosan, and may be produced by reacting chitosan with the alkylene oxide or oxiranemethanol. It is, however, to be noted that the hydroxyalkylated chitosan for use in the present invention is not limited to such a hydroxyalkylated chitosan and a hydroxyalkylated chitosan produced by another process can also be used likewise. As the above-described alkylene oxide or oxiranemethanol, a single alkylene oxide or oxiranemethanol may be used, or plural alkylene oxides or oxiranemethanols may be used in combination.

When the hydroxyalkylated chitosan for use in the present invention is produced by reacting chitosan and the corresponding alkylene oxide, the production is conducted by dispersing chitosan in a water-containing alcohol medium such as, for example, water-containing isopropyl alcohol or water under stirring. After the thus-obtained dispersion is adjusted alkaline, for example, with sodium hydroxide or the like, the alkylene oxide is added, followed by heating with stirring to obtain the hydroxyalkylated chitosan.

When the glycerylated chitosan for use in the present invention is produced by reacting chitosan and the corresponding oxiranemethanol, on the other hand, chitosan is beforehand dispersed, for example, in water-containing isopropyl alcohol under stirring. To resulting dispersion, the oxiranemethanol is added, followed by heating with stirring to obtain the glycerylated chitosan. It is to be noted that in the present invention, the glycerylated chitosan will hereinafter be embraced in the term "hydroxyalkylated chitosan".

From the standpoint of the solubility of such a hydroxyalkylated chitosan in an aprotic polar solvent, the degree of addition of a corresponding alkylene oxide or oxiranemethanol to chitosan [the degree of hydroxyalkylation (no unit)] may preferably be 0.2 (mole) or greater but 4 (moles) or less per pyranose ring (mole of pyranose). To obtain such a hydroxyalkylation degree, it is desired to add and react 0.3 (mole) or greater but 10 (moles) or less of the alkylene oxide per pyranose ring (mole pyranose) that makes up chitosan. A hydroxylation degree of 0.2 or less is insufficient from the standpoint of the solubility in the aprotic polar solvent. Even when the hydroxylation degree exceeds 4, on the other hand, the solubility in the aprotic polar solvent does not change so that the setting of the hydroxyalkylation degree beyond 4 is uneconomical.

In the present invention, no particular limitation is imposed on the source of chitosan as a raw material for the hydroxyalkylated chitosan and the production process of the hydroxyalkylated chitosan, and chitosan products which have been industrially manufactured to date are all usable. Further, no particular limitation is imposed either on the deacetylation degree or polymerization degree of chitosan. Preferably, however, the deacetylation degree of chitosan may be 30% or higher, with 70% to 100% being more preferred and 80% to 100% being still more preferred.

Preferred as chitosan can be such chitosan that as an aqueous solution containing the chitosan at 1 wt % and acetic acid at 1 wt %, the viscosity of the aqueous solution (20° C.) ranges from 1 mPa·s to 10,000 mPa·s. A deacetylation degree of lower than 30% is insufficient from the standpoint of the solubility of a hydroxyalkylated chitosan, which is available from a reaction with the corresponding alkylene oxide or oxiranemethanol, in the aprotic polar solvent. If the above-described viscosity is lower than 1 mPa·s, the resulting coating is insufficient in strength. If the above-described viscosity is higher than 10,000 mPa·s, on the other hand, a solution of the resulting hydroxyalkylated chitosan has an excessively high viscosity so that the concentration of the hydroxyalkylated chitosan has to be limited at a very low level. Therefore, viscosities outside the above-described range are not preferred.

Chitosan, which is employed as a raw material for the hydroxyalkylated chitosan to be used in the present invention, may more preferably be one having a deacetylation degree of from 80% to 100% and, as an aqueous solution containing 1 wt % of the chitosan and 1 wt % of acetic acid, giving a viscosity of from 3 mPa·s to 100 mPa·s from the standpoints of the solubility of the chitosan and the strength of the resulting coating.

As the organic acid or its derivative for use in the present invention, those known to date can each be used, including organic acids such as salicylic acid, pyromellitic acid, citric acid, trimellitic acid, malic acid, pyrrolidone carboxylic acid, polymaleic acid, phthalic acid, succinic acid and 1,2,3,4-butanetetracarboxylic acid. Preferred can be polybasic acids, their acid anhydrides, and salts of some or all of their carboxyl groups, notably their ammonium salts and amine salts and alkyl esters, amides, imides, amide-imides and the like of some or all of their carboxyl groups. Preferred as derivatives of these polybasic acids are compounds which regenerate polybasic acids upon heating of coatings to be formed subsequently.

More preferably, the polybasic acid can be at least one acid selected from the group consisting of pyromellitic acid, citric acid, trimellitic acid, malic acid, polymaleic acid, phthalic acid, and succinic acid.

From the aspects of the solubility of the hydroxyalkylated chitosan in the organic solvent and the crosslinkability of the hydroxyalkylated chitosan, pyromellitic acid and trimellitic acid, each of which is a trivalent or higher aromatic polycarboxylic acid, and their acid anhydrides are preferred. In the hydroxyalkylated chitosan solution according to the present invention, the organic acid may be used preferably in an amount of from 20 to 300 parts by weight per 100 parts by weight of the hydroxyalkylated chitosan. Use of the organic acid in an amount of smaller than 20 parts by weight results in the formation of a coating which is insufficient in waterproofness. On the other hand, use of the organic acid in an amount of greater than 300 parts by weight leads to the formation of a coating with reduced flexibility, and moreover, is uneconomical because the waterproofness of the coating is not improved with the used amount of the organic acid.

As the aprotic polar solvent for use in the present invention, those known to date can each be used. Examples include ethers (diethyl ether, diisopropyl ether, tetrahydrofuran, 1,2-dioxane, etc.), carbonates (ethylene carbonate, ethyl methyl carbonate, diethyl carbonate, dimethyl carbonate, propylene carbonate, butylene carbonate, etc.), amides (formamide, N-methylformamide, N-methylacetamide, N-ethylformamide, N,N-dimethylformamide, N,N-diethylformamide, acetamide, N-methylacetamide, N-ethylacetamide, N,N-dimethylacetamide, N,N-diethylacetamide, N-methyl-2-pyrrolidone, N-ethyl-2-pyrrolidone, piperidone, N-methylpiperidone, N-ethylpiperidone, hexamethylphosphoric triamide, 1,3-dimethyl-2-imidazolidinone, methyloxazolidinone, ethyloxazolidinone, etc.), sulfoxides (dimethyl sulfoxide, etc.), and sulfones (tetramethylene sulfone, etc.). Among these, N,N-dimethylformamide, N,N-dimethylacetamide, N-methyl-2-pyrrolidone, N-ethyl-2-pyrrolidone, 1,3-dimethyl-2-imidazolidinone and dimethyl sulfoxide are more preferred. With respect to these aprotic polar solvents, a selection is made as desired depending on the application. These aprotic polar solvents maybe used either singly or in combination.

As the organic acid and aprotic polar solvent for use in the present invention, general commercial products can be used as they are, or they may be used after purification as needed. Concerning the hydroxyalkylated chitosan, one produced by the above-described process may be used with the reaction solvent, byproducts and/or the like still contained therein, or may be used after purification.

As the order of addition of the hydroxyalkylated chitosan and organic acid to the aprotic polar solvent upon their dissolution in the solvent to prepare the hydroxyalkylated chitosan solution according to the present invention, either the hydroxyalkylated chitosan or the organic acid may be added first or they may be added at the same time. As their dissolution method, stirring may be conducted with heating as needed although stirring at room temperature is sufficient.

The existence of water contained in individual additives to be used as needed and the existence of water formed when the organic acid is a hydrate or the like affect neither the hydroxyalkylated chitosan solution according to the present invention nor the formation of a coating on a substrate by the solution. No conditions are thus applied to such water.

The concentration of the hydroxyalkylated chitosan in the hydroxyalkylated chitosan solution according to the present invention may range preferably from 1 to 40 wt %, more preferably from 5 to 10 wt % from the viewpoints of coating applicability, transport cost and the like. A concentration lower than 1 wt % makes it difficult to obtain a stable coating, while a concentration higher than 40 wt % makes it hard to obtain a homogeneous solution.

The hydroxyalkylated chitosan solution according to the present invention can be used for coating a substrate as it is. For improving the applicability to a substrate, however, it is possible to add an organic substance, such as a cationic surfactant, a nonionic surfactant or a lipophilic or hydrophobic organic solvent, an inorganic filler or the like. Further, the addition of a preservative, antimold agent or the like is not particularly inhibited. In addition, a crosslinking agent other than an organic acid may also be incorporated in the hydroxyalkylated chitosan solution as needed.

Examples of the crosslinking agent other than the organic acid include epoxy compounds such as ethylene glycol diglycidyl ether, polyethylene glycol diglycidyl ether and glycerol polyglycidyl ether; isocyanate compounds such as toluylen diisocyanate, xylylenediisocyanate, hexamethylene diisocyanate and phenyl diisocyanate, and blocked isocyanate compounds formed by blocking such isocyanate compounds with blocking agents such as phenols, alcohols, active methylene compounds, mercaptans, acid-amides, imides, amines, imidazoles, ureas, carbamic acids, imines, oximes or sulfites; aldehyde compounds such as glyoxal, glutaraldehyde, and dialdehyde starch; (meth)acrylate compounds such as polyethylene glycol diacrylate, polyethylene glycol dimethacrylate and hexanediol diacrylates; methylol compounds such as methylolmelamine and dimethylol urea; organic acid metal salts such as zirconyl acetate, zirconyl carbonate and titanium lactate; metal alkoxide compounds such as aluminum trimethoxide, aluminum tributoxide, titanium tetraethoxide, titanium tetrabutoxide, zirconium tetrabutoxide, aluminum dipropoxide acethylacetonate, titanium dimethoxide bis(acetylacetonate) and titanium dibutoxide bis(ethylacetoacetate); carbodiimide compounds; and the like. The use of such a crosslinking agent is not essential. When to be employed, however, the amount of the crosslinking agent may suitably range from 0.1 to 200 wt % based on the hydroxyalkylated chitosan.

The coating process of the present invention for the substrate comprises the step of causing the hydroxyalkylated chitosan solution according to the present invention to adhere onto the surface of the substrate, and the step of heating the substrate, which has been obtained in the first-mentioned step, at not lower than 100° C. for at least 1 second. Examples of the substrate to be coated by the hydroxyalkylated chitosan solution according to the present invention include, but are not limited to, glass, ceramics, plastics, metals, fibers, nonwoven products, and packaging materials (for example, plastic films, and composite films of aluminum and resins).

According to the coating process of the present invention, various substrates on each of which a coating of a hydroxyalkylated chitosan, said coating containing an organic acid, is applied can each be obtained by applying a hydroxyalkylated chitosan solution onto the substrate by spraying, coating or impregnation to form a coating and then causing the solvent to evaporate from the coating until the content of the solvent in the coating is decreased to 15% or lower, preferably 5% or lower based on the weight of the hydroxyalkylated chitosan in the coating. No particular limitation is imposed on the thickness of each coating to be formed by the above-described process, and the thickness of each coating may generally range from 1 to 500 µm or so. The drying of the substrate with the hydroxyalkylated chitosan solution coated thereon may preferably be conducted under reduced pressure or ambient pressure at a temperature of the boiling point of the solvent or higher. To provide the thus-formed coating with improved waterproofness, the substrate with the coating formed thereon can be heated preferably at 100° C. or higher for 1 second or longer, more preferably at 150 to 250° C. for 1 second to 10 minutes after drying. If the heating temperature is lower than 100° C. or the heating time is shorter than 1 second as a heat treatment condition, no coating can be obtained with excellent waterproofness.

The present invention is useful especially when the substrate is an aluminum foil or copper foil to be used for the fabrication of an electrode plate for a nonaqueous electrolyte secondary battery. Described specifically, when an active material for an electrode is added to the above-described solution of the present invention and a layer of the active material is formed on a surface of an aluminum foil or copper foil as a collector, an active material layer having excellent adhesion to the collector can be formed.

It is to be noted that the application of the hydroxylated chitosan solution according to the present invention is not limited to the coating of a substrate by spraying, coating, impregnation or the like. For example, solid particles containing the hydroxyalkylated chitosan can be obtained by drying the hydroxyalkylated chitosan solution in air by a method such as spray drying. A film with the hydroxyalkylated chitosan contained therein can also be obtained by casting the hydroxyalkylated chitosan solution on a glass plate and then coating it.

As has been described above, the hydroxyalkylated chitosan solution according to the present invention contains only the hydroxyalkylated chitosan, organic acid and aprotic polar solvent as its essential elements, is easy to produce, and is extremely useful as a coating forming composition, which is equipped with functionality and waterproofness, especially for a hydrophobic or lipophilic substrate surface or metal article surface the coating of which with an aqueous solution of chitosan or the like has heretofore been difficult.

EXAMPLES

The present invention will next be described more specifically based on Examples and Comparative Examples. It is to be noted that the present invention shall not be limited by these Examples.

Examples and Comparative Examples of Glycerylated Chitosan

The compositions of individual glycerylated chitosan solutions employed in the Examples and Comparative Examples are shown in Table 1. Examples 14-16 are all directed to the same composition, but the composition is repeatedly described because conditions in the coating process of the present invention were different. The expression "viscosity of 1% raw chitosan solution" in the table indicates the viscosity of a 1 wt % acetic acid solution containing 1 wt % of chitosan as a raw material for the corresponding glycerylated chitosan (viscosity measuring method: measured by a Brookfield rotational viscometer under the conditions consisting of a measuring temperature of 20° C. and a measuring rotation speed of 30 rpm). Concerning aprotic polar solvents used in the respective glycerylated chitosan solutions, the following abbreviations are used: NMP (N-methyl-2-pyrrolidone), DMF (N,N-dimethylformamide), DMSO (dimethylsulfoxide), DMAC (N,N-dimethylacetamide), and DMI (1,3-dimethyl-2-imidazolidinone).

Example 1

Dispersed in NMP (80 parts by weight) was glycerylated chitosan (deacetylation degree of raw chitosan: 83%; 10 parts by weight). After salicylic acid (10 parts by weight) was added to the dispersion, the resulting mixture was stirred at room temperature for 4 hours to effect dissolution. After the thus-prepared solution was allowed to stand overnight, it was again stirred at room temperature for 1 hour to effect dissolution so that a glyceryl chitosan solution (100 parts by weight) was prepared.

Examples 2-21

In a similar manner as in Example 1, glycerylated chitosan solutions according to the present invention were each prepared with the viscosity of an aqueous 1 wt % acetic acid solution containing the raw chitosan for the corresponding glycerylated chitosan, the glycerylation degree and weight of the glycerylated chitosan, the kind and weight of the organic acid, the mixing ratio of the glycerylated chitosan to the organic acid and the kind and weight of the aprotic polar solvent being changed as shown in Table 1. The deacetylation degree of the raw chitosan employed was 83%. It is to be noted that, when it was difficult to dissolve the glycerylated chitosan by stirring at room temperature, stirring was conducted with heating to prepare the solution.

Preparation procedures of the various solutions employed as the Comparative Examples will be described hereinafter.

Comparative Example 1

Comparative Example 1 is directed to the use of chitosan not subjected to a glycerylation reaction (deacetylation degree: 85%, glycerylation degree: 0, viscosity of an aqueous 1 wt % acetic acid solution containing the chitosan at 1 wt %: 6 mPa·s; hereinafter simply called "the chitosan"). The chitosan (5 parts by weight) was dispersed in NMP (90 parts by weight). Subsequent to the addition of pyromellitic acid (5 parts by weight), the thus-obtained mixture was stirred at room temperature for 4 hours, but the chitosan was not dissolved at all. The NMP was then heated to 80° C., at which stirring was conducted for 2 hours. However, the chitosan was not dissolved at all, and therefore, no chitosan NMP solution was obtained.

Comparative Example 2

Comparative Example 2 is directed to the preparation of a solution without using any organic acid. Glycerylated chitosan (deacetylation degree of raw chitosan: 83%; 10 parts by weight) was dispersed in NMP (90 parts by weight), followed by stirring at room temperature for 4 hours. After the resultant dispersion was allowed to stand overnight, it was again stirred at room temperature for 1 hour to effect dissolution so that a glyceryl chitosan solution (100 parts by weight) was prepared.

Comparative Example 3

Dispersed in NMP (90 parts by weight) was glycerylated chitosan (deacetylation degree of raw chitosan: 85%; 5 parts by weight). After pyromellitic acid (5 parts by weight) was added to the dispersion, the resulting mixture was stirred at room temperature for 4 hours to effect dissolution. After the thus-prepared solution was allowed to stand overnight, it was again stirred at room temperature for 1 hour to effect dissolution so that a glyceryl chitosan solution (100 parts by weight) was prepared.

TABLE 1

Glycerylated Chitosan Solutions

| | Viscosity of 1% raw chitosan solution (mPa·s) | Glycerylated chitosan Glyceryl-ation degree | Parts by weight | Organic acid Kind | Parts by weight | Aprotic polar solvent Kind | Parts by weight |
|---|---|---|---|---|---|---|---|
| Example 1 | 8 | 1.1 | 10 | Salicylic acid | 10 | NMP | 80 |
| Example 2 | 7 | 1.8 | 5 | Citric acid | 5 | NMP | 90 |
| Example 3 | 2 | 2.3 | 20 | Malic acid | 5 | NMP | 75 |
| Example 4 | 130 | 1.8 | 2 | Pyrrolidone-carboxylic acid | 2 | NMP | 96 |
| Example 5 | 4120 | 3.7 | 1 | Maleic acid | 1 | NMP | 98 |
| Example 6 | 6 | 0.5 | 5 | Polymaleic acid | 5 | NMP | 90 |
| Example 7 | 6 | 1.1 | 10 | Trimellitic acid | 10 | NMP | 80 |
| Example 8 | 15 | 1.5 | 3 | Trimellitic anhydride | 3 | NMP | 94 |
| Example 9 | 6 | 1.1 | 10 | Pyromellitic acid | 5 | NMP | 85 |
| Example 10 | 6 | 1.1 | 5 | Pyromellitic anhydride | 5 | NMP | 90 |
| Example 11 | 6 | 1.1 | 5 | Succinic anhydride | 5 | NMP | 90 |
| Example 12 | 6 | 1.1 | 10 | Phthalic anhydride | 10 | NMP | 80 |
| Example 13 | 6 | 1.5 | 5 | Pyromellitic acid | 1 | NMP | 94 |
| Example 14 | 6 | 1.1 | 5 | Pyromellitic acid | 5 | NMP | 90 |
| Example 15 | 6 | 1.1 | 5 | Pyromellitic acid | 5 | NMP | 90 |
| Example 16 | 6 | 1.1 | 5 | Pyromellitic acid | 5 | NMP | 90 |
| Example 17 | 6 | 1.1 | 10 | Pyromellitic acid | 5 | DMF | 85 |
| Example 18 | 6 | 1.1 | 10 | Pyromellitic acid | 5 | DMAC | 85 |
| Example 19 | 6 | 1.1 | 10 | Pyromellitic acid | 5 | DMI | 85 |
| Example 20 | 6 | 1.1 | 10 | Pyromellitic acid | 5 | DMSO | 85 |
| Example 21 | 6 | 1.1 | 2 | Pyromellitic acid | 5 | NMP | 93 |
| Comp. Ex. 1 | 6 | Chitosan | 5 | Pyromellitic acid | 5 | NMP | 90 |
| Comp. Ex. 2 | 8 | 3.2 | 10 | — | — | NMP | 90 |
| Comp. Ex. 3 | 6 | 1.1 | 5 | Pyromellitic acid | 5 | NMP | 90 |

On coatings obtained by using the individual glycerylated chitosan solutions prepared in accordance with the compositions shown in Table 1 and by following the below-described coating forming method, a waterproofness evaluation test was performed. The evaluation results are shown in Table 2.

<Coating Forming Method>

On surfaces of stainless steel sheets (SUS304, 1 mm thick× 10 cm long×10 cm wide) which had not been subjected to any pretreatment such as degreasing treatment, the various solutions of Examples 1-21 and Comparative Examples 2 and 3 were coated by a bar coater to give dry coat weights of 2 g/m², respectively. Under the conditions shown in Table 2, drying was then conducted. The thus-coated stainless steel sheets were provided as specimens to be used in the following evaluation test.

<Waterproofness Evaluation Testing Method>

Each specimen was immersed for 24 hours in purified water, and was then dried under heat for 1 hour in a fan dryer controlled at 105° C. After being allowed to cool down to room temperature, its weight was measured, and in accordance with the following formula, the percent residue of its coating was determined.

$$(C-A)/(B-A) \times 100 (\%)$$

where,
- A: Weight of a stainless steel sheet before coating a solution,
- B: Weight of the stainless steel sheet after coating and drying the solution, and
- C: Weight of the stainless steel after immersing, subsequent to the coating and drying of the solution, the stainless steel for 24 hours in water and then conducting drying again.

<Evaluation Standards for Waterproofness>

The waterproofness of each coating was evaluated in 4 stages based on the value obtained in accordance with the above-described formula. The evaluation method was as follows:
- A: Percent residue of coating≧95%
- B: 95%>percent residue of coating≧80%
- C: 80%>percent residue of coating≧50%
- D: 50%>percent residue of coating

TABLE 2

Drying Conditions and Evaluation Results of Waterproofness of Coatings

| | Vacuum drying conditions | | | Heated-air drying conditions (ambient pressure) | | Waterproofness of coating | |
|---|---|---|---|---|---|---|---|
| | Degree of vacuum (Pa) | Temp. (° C.) | Time (min) | Temp. (° C.) | Time (sec) | Percent residue of coating (%) | Waterproofness |
| Example 1 | — | — | — | 220 | 60 | 67 | C |
| Example 2 | — | — | — | 220 | 60 | 100 | A |

TABLE 2-continued

Drying Conditions and Evaluation Results of Waterproofness of Coatings

| | Vacuum drying conditions | | | Heated-air drying conditions (ambient pressure) | | Waterproofness of coating | |
|---|---|---|---|---|---|---|---|
| | Degree of vacuum (Pa) | Temp. (° C.) | Time (min) | Temp. (° C.) | Time (sec) | Percent residue of coating (%) | Waterproofness |
| Example 3 | — | — | — | 220 | 60 | 81 | B |
| Example 4 | — | — | — | 220 | 60 | 55 | C |
| Example 5 | — | — | — | 220 | 60 | 95 | A |
| Example 6 | — | — | — | 220 | 60 | 100 | A |
| Example 7 | — | — | — | 220 | 60 | 100 | A |
| Example 8 | — | — | — | 220 | 60 | 100 | A |
| Example 9 | — | — | — | 220 | 60 | 100 | A |
| Example 10 | — | — | — | 220 | 60 | 100 | A |
| Example 11 | — | — | — | 220 | 60 | 92 | B |
| Example 12 | — | — | — | 220 | 60 | 88 | B |
| Example 13 | — | — | — | 220 | 60 | 72 | C |
| Example 14 | — | — | — | 250 | 30 | 100 | A |
| Example 15 | 100 | 40 | 30 | 180 | 60 | 100 | A |
| Example 16 | 100 | 40 | 30 | 150 | 300 | 100 | A |
| Example 17 | — | — | — | 220 | 60 | 100 | A |
| Example 18 | — | — | — | 220 | 60 | 100 | A |
| Example 19 | — | — | — | 240 | 60 | 92 | B |
| Example 20 | — | — | — | 220 | 60 | 98 | A |
| Example 21 | — | — | — | 220 | 60 | 97 | A |
| Comp. Ex. 1 | — | — | — | — | — | — | — |
| Comp. Ex. 2 | — | — | — | 220 | 60 | 0 | D |
| Comp. Ex. 3 | 100 | 40 | 30 | — | — | 0 | D |

As is evident from the above results of Table 2, the results of the waterproofness evaluations of the coatings formed using the glycerylated chitosan solutions according to the present invention were good. Comparative Example 1 is directed to the illustrative use of chitosan in place of a glycerylated chitosan. The chitosan was not dissolved in NMP so that no solution was successfully prepared. In Comparative Example 2, the NMP solution was prepared using the glycerylated chitosan of the high degree of substitution (glycerylation degree: 3.2) without using any organic acid. The coating formed from the solution was not equipped with any waterproofness. In Comparative Example 3, the coating was formed using a vacuum dryer without heated-air drying at high temperatures. As a result, the waterproofness of the coating was poor.

To evaluate the pot lives of the above-described glycerylated chitosan solutions, portions of the individual solutions of Examples 1-21 (the solutions of Examples 14-16 were the same) were stored in a room (20 to 28° C.) and in a constant-temperature chamber (50° C.), respectively, to observe any changes with time in the solution forms. Even after an elapsed time of 3 months or longer, all of the solutions neither increased in viscosity nor formed a gel, and therefore, were usable for coating substrates.

Example 22

Onto a polyimide film of 50 μm thickness (10 cm×5 cm), the 5 wt % glycerylated chitosan solution of Example 14 (solution viscosity: 174 mPa·s) was coated by a bar coater. Repelling of the NMP solution was not observed at all, and uniform coating was feasible onto the polyimide film the surface of which was hydrophobic.

Comparative Example 4

Onto a polyimide film of 50 μm thickness (10 cm×5 cm), a 5 wt % aqueous solution (solution viscosity: 186 mPa·s) of citric acid, said solution containing 5 wt % of chitosan, was coated by a bar coater. The aqueous solution was repelled. It was, therefore, unable to uniformly coat the aqueous solution onto the polyimide film.

Examples 23-25

In Table 3, the compositions of individual hydroxyalkylated chitosan solutions employed as Examples 23-25 are shown. The abbreviations of the aprotic polar solvents used in the individual hydroxyalkylated chitosan solutions are as defined above. The production of the hydroxyalkylated chitosans was conducted in a manner known per se in the art. The raw chitosan for the hydroxyalkylated chitosans was the same as that employed above in Example 6.

TABLE 3

Hydroxyalkylated (HA) Chitosan Solutions

| | Hydroxyalkylated chitosan | | | Organic acid | | Aprotic polar solvent | |
|---|---|---|---|---|---|---|---|
| | Hydroxyalkyl group | Hydroxy-alkylation degree | Parts by weight | Kind | Parts by weight | Kind | Parts by weight |
| Example 23 | Hydroxyethyl | 1.9 | 5 | Pyromellitic acid | 5 | NMP | 90 |
| Example 24 | Hydroxypropyl | 1.8 | 5 | Pyromellitic acid | 5 | DMF | 90 |
| Example 25 | Hydroxybutyl | 1.8 | 5 | Pyromellitic acid | 5 | DMAC | 90 |

On coatings obtained by using the hydroxyalkylated chitosan solutions described in Table 3 and following the same coating forming method as in the case of the glycerylated chitosans, a waterproofness evaluation test was performed in a similar manner as described above. The evaluation results are shown in Table 4.

TABLE 4

Drying Conditions and Evaluation Results of Waterproofness of Coatings

| | Vacuum drying conditions | | | Heated-air drying conditions (ambient pressure) | | Waterproofness of coating | |
|---|---|---|---|---|---|---|---|
| | Degree of vacuum (Pa) | Temp. (° C.) | Time (min) | Temp. (° C.) | Time (sec) | Percent residue of coating (%) | Waterproofness |
| Example 23 | — | — | — | 220 | 60 | 100 | A |
| Example 24 | — | — | — | 220 | 60 | 99 | A |
| Example 25 | — | — | — | 220 | 60 | 100 | A |

As is evident from the above results of Table 4, the results of the waterproofness evaluations of the coatings formed using the glycerylated chitosan solutions according to the present invention were good.

Application Examples to Batteries

Application Example 1

Coating Formulation, Electrode Plate

A positive-electrode coating formulation employed in this Example and containing a positive electrode active material was prepared by the procedure to be described hereinafter. As materials for the positive-electrode coating formulation, .LiCoO$_2$ powder having particle sizes of from 1 to 100 µm, acetylene black as a conductive aid and the solution of Example 14 described above in Table 1 were stirred and mixed at a mixing ratio of 90 parts by weight, 5 parts by weight and 50 parts by weight at a rotation speed of 60 rpm for 120 minutes in a planetary mixer to obtain a slurry-form, positive-electrode coating formulation with the positive-electrode active material contained therein.

Using the positive-electrode coating formulation obtained as described above and employing, as a substrate, a collector formed of a 20-µm thick aluminum foil, the positive-electrode coating formulation was applied on one side of the substrate by a "COMMA ROLL COATER". The thus-coated substrate was then dried for 2 minutes in an oven controlled at 110° C., and was further dried for 2 minutes in the oven controlled at 150° C. to eliminate the solvent and to have the binder crosslinked, so that a positive electrode plate with an active material layer formed with a dry thickness of 100 µm on the collector was obtained. The positive electrode plate obtained by the above-described procedure was pressed under conditions of 5,000 kgf/cm$^2$ to make the coating uniform. Subsequently, aging was conducted for 48 hours in a vacuum oven controlled at 80° C. to completely eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer to form 100 squares within 1 cm$^2$. A mending tape was applied to the surface of the active material layer, and tape peeling was then conducted. The number of squares which were not peeled off was counted as a measure of adhesiveness. The average of 10 tests was 98.0 squares. Further, the conditions of the active material layer were observed after the electrode plate with the squares formed thereon as described above was immersed at 50° C. for 24 hours in a mixed solvent of EC (ethylene carbonate), PC (propylene carbonate) and DME (dimethoxyethane) combined together at a volume ratio of 1:1:2. Neither peeling nor swelling of the active material layer was recognized.

Application Example 2

Coating Formulation, Electrode Plate

A negative-electrode coating formulation employed in this Example and containing a negative-electrode active material was prepared by the procedure to be described next. Carbon powder obtained by thermal degradation of coal coke at 1,200° C., acetylene black as a conductive aid and the solution of Example 8 described above were stirred and mixed at a mixing ratio of 90 parts by weight, 5 parts by weight and 50 parts by weight at a rotation speed of 60 rpm for 120 minutes in the planetary mixer to obtain a slurry-form coating formulation with the negative-electrode active material contained therein.

The coating formulation containing the negative-electrode active material and obtained as described above was applied onto a copper-foil collector by using the "COMMA ROLL COATER". After the thus-coated collector was processed through a drying step, it was dried for 2 minutes in the oven controlled at 110° C., and was further dried for 2 minutes in the oven controlled at 150° C. to eliminate the solvent and to have the binder crosslinked, so that an active material layer was formed with a dry thickness of 100 μm on the collector. A negative electrode plate obtained by the above-described procedure was pressed under conditions of 5,000 kgf/cm² to make the coating uniform. Subsequently, aging was conducted for 48 hours in a vacuum oven controlled at 80° C. to completely eliminate volatiles (the solvent, the unreacted polybasic acid, etc.).

Parallel lines, which consisted of perpendicularly-intersecting 11 vertical lines and 11 horizontal lines, were drawn by a cutter at intervals of 1 mm on the active material layer to form 100 squares within 1 cm². A mending tape was applied to the surface of the active material layer, and tape peeling was then conducted. The number of squares which were not peeled off was counted as a measure of adhesiveness. The average of 10 tests was 96 squares. Neither peeling nor swelling of the active material layer was recognized.

Application Example 3

Battery

An electrode unit was first formed by using the positive-electrode plate and negative-electrode plate, which had been obtained above in Application Example 1 and Application Example 2, respectively, and rolling them into a volute form with a separator interposed therebetween. The separator was made of a porous polyolefin (polypropylene, polyethylene or a copolymer thereof) film having a width broader than the positive-electrode plate and a three-dimensional porous (spongy) structure. The electrode unit was then inserted into a bottomed cylindrical, stainless steel can, which would also serve as a negative-electrode terminal, so that a battery of the AA size and 500 mAh rated capacity was assembled. Charged as an electrolyte into the battery was a solution of 1 mole of $LiPF_6$ as a supporting salt in a mixed solvent prepared by combining EC (ethylene carbonate), PC (propylene carbonate) and DME (dimethoxyethane) at a volume ratio of 1:1:2 to give a total volume of 1 liter.

For the measurement of battery characteristics, a charge-discharge measuring instrument was used. Twenty (20) batteries were charged at the temperature condition of 25° C. and the current value of a 0.2 CA charging current, firstly in a charging direction until a battery voltage reached 4.1 V. After a break of 10 minutes, the cells were discharged by the same current until 2.75 V was reached. Subsequent to a break of 10 minutes, charging and discharging were then repeated 100 cycles under the same conditions to measure charge-discharge characteristics. When the charge-discharge capacity in the $1^{st}$ cycle was assumed to be 100, the charge-discharge capacity in the $100^{th}$ cycle was 96.

Industrial Applicability

The hydroxyalkylated chitosan solution according to the present invention is easy to produce, and is extremely useful as a coating composition capable of applying a coating, which is equipped with functionality and waterproofness, to a hydrophobic or lipophilic surface the coating of which with an aqueous solution has heretofore been difficult. It is also useful as a binder upon fabrication of electrode plates for batteries.

The invention claimed is:

1. A hydroxyalkylated chitosan solution comprising an aprotic polar solvent, a hydroxyalkylated chitosan which is a hydroxyalkylation product of chitosan, wherein said chitosan has a deacetylation degree of at least 30%, and a trivalent or higher polybasic organic acid or a derivative thereof.

2. The solution of claim 1, wherein said aprotic polar solvent is at least one solvent selected from the group consisting of N,N-dimethylformamide, N,N-dimethylacetamide, N-methyl-2-pyrrolidone, N-ethyl-2-pyrrolidone, 1,3-dimethyl-2-imidazolidinone, and dimethyl sulfoxide.

3. The solution of claim 1, wherein said acid is at least one acid selected from the group consisting of pyromellitic acid, citric acid, trimellitic acid, polymaleic acid, and 1,2,3,4-butane tetracarboxylic acid.

4. The solution of claim 1, wherein said organic acid or said derivative thereof is used in an amount of from 20 to 300 parts by weight per 100 parts by weight of said hydroxyalkylated chitosan.

5. The solution of claim 1, wherein said hydroxyalkylated chitosan is contained at a concentration of from 1 to 40 wt %.

6. The solution of claim 1, wherein said hydroxyalkylated chitosan has a hydroxyalkylation degree of at least 0.2.

7. The solution of claim 1, wherein when said chitosan is dissolved at a concentration of 1 wt % in a 1 wt % aqueous solution of acetic acid, a resulting solution has a viscosity of from 1 mPa·s to 10,000 mPa·s.

8. A coating process of a substrate, which comprises a step of causing a hydroxyalkylated chitosan solution according to any one of claims 1, 2, 3, 4, 5, 6, or 7, to adhere onto a surface of said substrate, and another step of heating said substrate, which has been obtained in the first-mentioned step, at not lower than 100° C. for at least 1 second.

9. The process of claim 8, wherein said hydroxyalkylated chitosan solution comprises organic or inorganic particles and said substrate is a metal article.

10. The solution of claim 1, wherein said hydroxyalkylated chitosan is at least one hydroxyalkylated chitosan selected from the group consisting of hydroxyethyl chitosan, hydroxypropyl chitosan, hydroxybutyl chitosan and glycerylated chitosan.

11. The solution of claim 1, wherein said solution forms a chitosan coating by crosslinking when drying under heat.

12. The solution of claim 1, wherein said solution is for coating on a metal article surface.

* * * * *